United States Patent
Kautz et al.

(10) Patent No.: US 10,852,386 B2
(45) Date of Patent: Dec. 1, 2020

(54) METHOD FOR CALIBRATING A LOCAL POSITIONING SYSTEM BASED ON TIME-DIFFERENCE-OF-ARRIVAL MEASUREMENTS

(71) Applicants: Swiss Timing Ltd, Corgemont (CH); Friedrich-Alexander-Universitaet Erlangen-Nuernberg, Erlangen (DE)

(72) Inventors: Thomas Kautz, Sangerhausen (DE); Sebastian Scholz, Leipzig (DE); Bjoern Eskofier, Erlangen (DE)

(73) Assignees: Swiss Timing Ltd, Corgemont (CH); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 286 days.

(21) Appl. No.: 15/778,264

(22) PCT Filed: Dec. 19, 2016

(86) PCT No.: PCT/EP2016/081737
§ 371 (c)(1),
(2) Date: May 23, 2018

(87) PCT Pub. No.: WO2017/121581
PCT Pub. Date: Jul. 20, 2017

(65) Prior Publication Data
US 2018/0348332 A1      Dec. 6, 2018

(30) Foreign Application Priority Data

Jan. 13, 2016   (EP) .................................... 16000066

(51) Int. Cl.
*G01S 5/02*       (2010.01)
*G01S 1/02*       (2010.01)
(Continued)

(52) U.S. Cl.
CPC .............. *G01S 5/021* (2013.01); *G01S 1/024* (2013.01); *G01S 5/0242* (2013.01);
(Continued)

(58) Field of Classification Search
CPC ........ G01S 5/021; G01S 5/0263; G01S 1/024; G01S 5/10; G01S 5/024; G06F 17/18
See application file for complete search history.

(56) References Cited

U.S. PATENT DOCUMENTS 6,420,999 B1 *  7/2002  Vayanos ................. G01S 5/021
                                                         342/357.31
8,451,763 B2 *  5/2013  Brundage ........... H04W 64/003
                                                         370/312
(Continued)

OTHER PUBLICATIONS

International Search Report dated Apr. 4, 2017 in PCT/EP2016/081737 filed Dec. 19, 2016.
(Continued)

*Primary Examiner* — Mohammad K Islam
(74) *Attorney, Agent, or Firm* — Oblon, McClelland, Maier & Neustadt, L.L.P.

(57) ABSTRACT

A method for calibrating a time difference of arrival-based local positioning system for k-D localization, k=2 or 3, includes collecting N sets of time difference of arrival measurements related to a mobile node, N≥2, each $n^{th}$ set of measurements being performed by Bn beacon nodes among B beacon nodes of the positioning system while the mobile node is located is a $n^{th}$ position within a region covered by the positioning system, Bn≥k+2, and determining optimal beacon positions that minimize an objective function depending on N residual error vectors, the calculation of each $n^{th}$ position of the mobile node using beacon positions and the $n^{th}$ set of measurements, the calculation allowing the calculation of the $n^{th}$ residual error vector.

9 Claims, 1 Drawing Sheet

(51) Int. Cl.
*G01S 5/10* (2006.01)
*G06F 17/18* (2006.01)

(52) U.S. Cl.
CPC .............. *G01S 5/0263* (2013.01); *G01S 5/10* (2013.01); *G06F 17/18* (2013.01)

(56) References Cited

U.S. PATENT DOCUMENTS

| | | | |
|---|---|---|---|
| 9,078,229 B1* | 7/2015 | Vannucci | G01S 5/0242 |
| 9,297,883 B1 | 3/2016 | Vannucci et al. | |
| 9,467,803 B2* | 10/2016 | Siomina | H04W 4/029 |
| 9,591,609 B1 | 3/2017 | Vannucci et al. | |
| 9,749,780 B2* | 8/2017 | Huang | G06Q 30/0623 |
| 9,841,489 B2* | 12/2017 | Boker | G01S 5/0273 |
| 10,088,317 B2* | 10/2018 | Chrysanthakopoulos | G01C 21/206 |
| 10,151,590 B2* | 12/2018 | Hansen | G01C 21/206 |
| 2005/0255864 A1* | 11/2005 | Kent | G01S 5/0221 455/456.5 |
| 2008/0077283 A1* | 3/2008 | Ueyama | G08G 1/096827 701/1 |
| 2008/0132247 A1* | 6/2008 | Anderson | H04W 64/00 455/456.2 |
| 2010/0225541 A1* | 9/2010 | Hertzog | G01S 5/0221 342/387 |
| 2010/0304763 A1 | 12/2010 | Anderson | |
| 2011/0033002 A1 | 2/2011 | Anderson et al. | |
| 2012/0082255 A1 | 4/2012 | Anderson et al. | |
| 2013/0021199 A1* | 1/2013 | Fix | G01S 5/0263 342/357.43 |
| 2014/0087754 A1* | 3/2014 | Siomina | H04W 4/029 455/456.1 |
| 2016/0239857 A1* | 8/2016 | Milton | G06Q 30/0205 |
| 2016/0247175 A1* | 8/2016 | Milton | G06Q 30/0205 |
| 2018/0176804 A1* | 6/2018 | Takeshita | H04W 8/183 |
| 2018/0321328 A1* | 11/2018 | Kushleyev | G01R 33/0017 |

OTHER PUBLICATIONS

Pelant, M. et al., "Multilateration system time synchronization via over-determination of TDOA measurements", Proceedings of ESAV'11, Sep. 12-14, 2011, pp. 179-183, XP032065921.

* cited by examiner

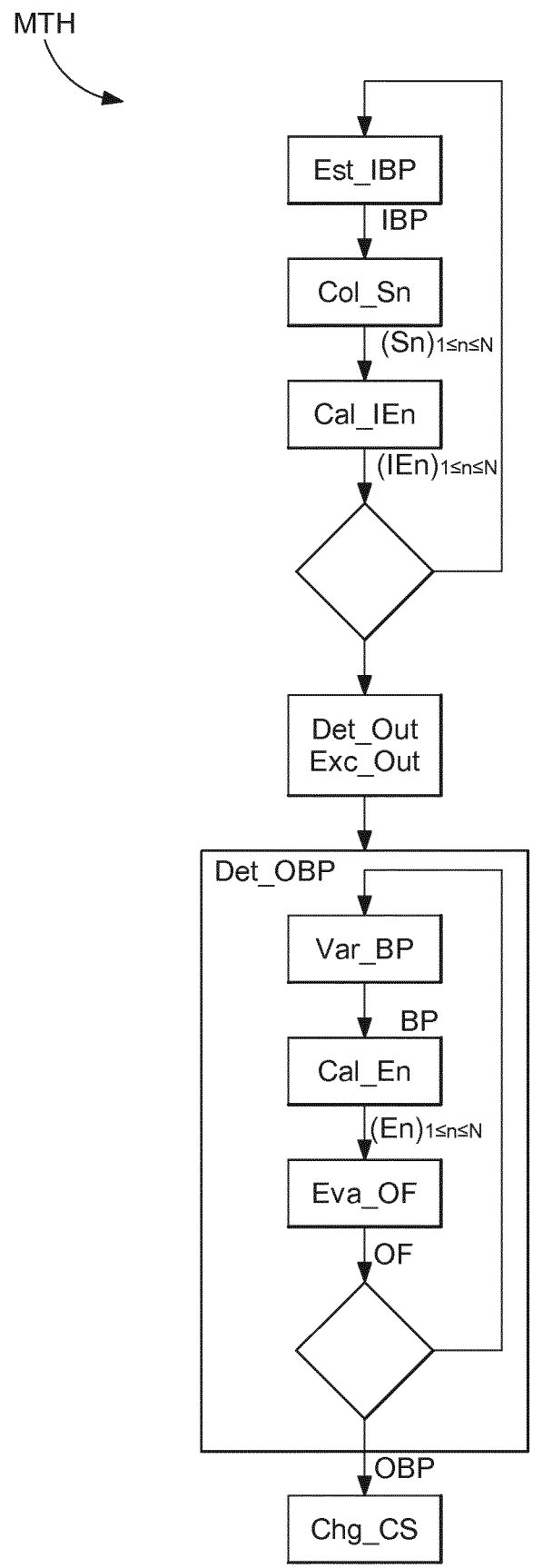

METHOD FOR CALIBRATING A LOCAL POSITIONING SYSTEM BASED ON TIME-DIFFERENCE-OF-ARRIVAL MEASUREMENTS

FIELD OF THE INVENTION

The invention relates to a method for calibrating a Local Positioning System (LPS) based on time-difference-of-arrival (TDoA) measurements.

BACKGROUND OF THE INVENTION

Local Positioning Systems are an enabling technology in a wide field of applications. Reliable position determination of objects or persons allows for example asset tracking, surveillance of production lines, robot navigation or the monitoring of athletes. LPSs can achieve higher accuracy and sampling rates than GPS. However, they require additional infrastructure in order to determine the position of the object of interest. LPSs consist of several beacon nodes with fixed and known positions and one or more mobile nodes that are attached to the object of interest. By transmitting signals (e.g. electromagnetic or acoustic) between the beacon nodes and the mobile node, information about the relative position between the nodes are acquired and the position of the mobile node can be determined. The position determination is usually based on the Time of Arrival (ToA), Time Difference of Arrival (TDoA) or the Angle-of-Arrival (AoA) principle. Independent of the employed measurement principle, the positions of the beacon nodes need to be known precisely before the object of interest with the mobile node can be accurately localized in the local coordinate system. The calibration of the LPS via manual measurements (e.g. using a theodolite) of the beacon node positions is often time-consuming, error-prone and cumbersome.

In order to facilitate the calibration process, some auto-calibration methods have been proposed in the literature. However, although TDoA systems are widely used, these calibration methods are only applicable for LPSs which are based on the ToA principle, and no LPS calibration method for TDoA systems has been reported yet.

SUMMARY OF THE INVENTION

It is an object of the invention to overcome these drawbacks in proposing an auto-calibration method of a Local Positioning System based on time-difference-of-arrival measurements.

Hence, the invention relates to a method for calibrating a time difference of arrival-based local positioning system for k–D localization, k=2 or 3, comprising the steps of:

Collecting N sets of time difference of arrival measurements related to a mobile node, N≥2, each $n^{th}$ set of measurements being performed by Bn beacon nodes among B beacon nodes of the positioning system while the mobile node is located is a $n^{th}$ position within a region covered by the positioning system, Bn≥k+2

Determining optimal beacon positions that minimize an objective function depending on N residual error vectors, calculation of each $n^{th}$ position of the mobile node using beacon positions and the $n^{th}$ set of measurements, said calculation allowing calculation of the $n^{th}$ residual error vector.

More particularly, the invention relates to a method for calibrating a time difference of arrival-based local positioning system for kD localization, k=2 or 3, comprising the steps of:

Estimating initial beacon positions,

Collecting N sets of time difference of arrival measurements related to a mobile node, N≥2, each $n^{th}$ set of measurements being performed by Bn beacon nodes among B beacon nodes of the positioning system while the mobile node is located is a $n^{th}$ position within a region covered by the positioning system, Bn≥k+2, Calculating N residual error vectors through calculation of the N positions of the mobile node, by means of the N sets of measurements and the beacon positions, the calculation of the $n^{th}$ position of the mobile node enabling the calculation of the $n^{th}$ initial residual error vector, the calculation of each $n^{th}$ position of the mobile node using the beacon positions and the $n^{th}$ set of measurement, Determining optimal beacon positions that minimize an objective function depending on the N residual error vectors.

TDoA-based Local Positioning Systems consist of several beacon nodes whose positions have to be found during the setup of the LPS, and at least a mobile node whose position is to be measured with the operating LPS. These systems rely on the measurement of the time difference of the arrival of one signal emitted by the mobile node at two beacon nodes, or two signals emitted by the mobile node and a reference node at one beacon node. In the first case, the time difference of arrival enables the calculation of the difference between the distances of the mobile node to the first beacon node and the mobile node to the second beacon node. In the latter case, the time difference of arrival enables the calculation of the difference between the distance of the mobile node to the beacon node and the reference node to the beacon. As a consequence, three measurements of time differences of arrival at different beacons are required for 2D localization of the mobile node, and four measurements are required for 3D localization.

However, if more measurements are available, the system of equations to be solved is overdetermined, and the quality of the position solution may be estimated as well. More precisely, a residual vector as a quality indicator for the determined position estimate of the mobile node can be calculated. The residual vector, which belongs to the real coordinate space $R^B$, includes the errors of the TDoA measurements of each of the B beacon nodes with respect to the estimated mobile node position. However, the residual vector is also influenced by errors in the assumed positions of the beacon nodes. In a least square sense, the lower the residual, the better the position estimate.

Since the method according to the invention provides that for every set of measurements, Bn≥k+2, N residual vectors can be calculated. Thus, a minimal objective function depending on these residual error vectors characterizes a good estimate of the beacon nodes positions.

Furthermore, the method according to the invention may comprise one or a combination of the following characteristics.

According to a not limited embodiment, the objective function is defined by $$\sqrt{\frac{1}{N} \sum_{n=1}^{N} \frac{|En|^2}{Bn}}.$$

Thus, the beacon positions for which the Root Mean Square of the residual per beacon node is minimal is sought. By normalizing each $n^{th}$ error vector En by the number of base stations Bn that were available for calculating the $n^{th}$ position, the influence of varying numbers of base stations is eliminated. If this normalization is omitted, the residuals of position estimates that were based on many base stations would be weighted higher in the objective function than the residuals of position estimates from only a few base stations. The additional normalization by the number of samples N allows a better comparison between the qualities of different positioning datasets that contain different numbers of samples/positions.

According to a not limited embodiment, the method comprises, between the step of collecting measurements and the step of determining optimal beacon positions, a step of detecting outliers in the measurements and excluding said outliers from the corresponding sets of measurements.

According to a not limited embodiment, the step of detecting outliers comprises calculating N residual error vectors corresponding to said initial beacon positions, and using a Grubb test on said vectors.

According to a not limited embodiment the step of determining optimal beacon positions comprises varying assumed beacon positions from the initial positions until the objective function meets a termination criterion.

According to a not limited embodiment, said termination criterion is a convergence of the objective function.

According to a not limited embodiment, if the norm of the residual error vectors corresponding to the initial beacon positions are higher than a threshold, then the method comprises a step of re-estimating initial beacon positions.

According to a not limited embodiment, the N mobile node positions are distributed over the whole region covered by the positioning system.

According to a not limited embodiment, within the step of determining optimal beacon positions, the mobile node positions are calculated in a coordinate system having a beacon node as point of origin, and the method comprises a final step of rotating and/or shifting the coordinate system.

BRIEF DESCRIPTION OF THE DRAWING

Other features and advantages of the present invention will appear more clearly upon reading the following detailed description, made with reference to the annexed drawing, given by way of non-limiting example, and showing a flow diagram of a method for calibrating a time-difference-of-arrival based local positioning system, according to a non-limited embodiment of the invention.

DETAILED DESCRIPTION OF THE PREFERRED EMBODIMENTS

The method according to the invention refers to a local positioning system for calculating the position of a mobile node. The system comprises B beacon nodes whose positions need to be determined so as to calibrate the positioning system. Assuming 2D movements of the mobile node, B is higher than 3. Assuming 3D movements of the mobile node, B is higher than 4. As illustrated on FIG. 1, the method MTH comprises the following steps.

In a step Est_IBP, initial beacon positions IBP are estimated in a coordinate system of the positioning system. Advantageously, the coordinate system may be centered on one beacon node, so as to reduce the number of beacon positions that are to be determined, and to limit the degrees of freedom of the resulting LPS coordinate system. The estimation may be performed in various ways, for instance by means of a theodolite, by means of a site plan or satellite photographs covering the LPS area, or using GPS position measurements.

In a step Col_Sn, N sets $(Sn)_{1 \le n \le N}$ of time-difference-of-arrival measurements related to the mobile node are collected, N≥2. Each set Sn comprises several time-difference-of-arrival measurements, wherein a time-difference-of-arrival measurement pertains either to one signal emitted by the mobile node and received at two beacon nodes, or to two signals emitted by the mobile node and a reference node and received at one beacon node. Between every two successive sets Sn of measurements, the mobile node is moved to a different position. Ideally, the mobile node positions are distributed over the whole region covered by the positioning system. This is to make sure that the calibrated beacon node positions are suitable for the whole region covered by the positioning system. By moving the mobile node around, measurements with different geometries between the mobile node and the beacon nodes are acquired. This makes the calibration more robust.

In the following description, Bn is the number of beacon nodes that receive a signal for the $n^{th}$ position of the mobile node. Bn≥4 for a movement in a 2D plane of the mobile node, Bn≥5 for movements of the mobile node in a 3D environment.

In a step Cal_IEn, N initial residual error vectors $(IEn)_{1 \le n \le N}$ are calculated through calculations of the N positions of the mobile node by means of the N sets $(Sn)_{1 \le n \le N}$ of measurements and the estimated initial beacon positions IBP. The calculation of each $n^{th}$ position of the mobile node uses the beacon positions and the $n^{th}$ set of measurements Sn, and enables the calculation of a $n^{th}$ residual error vector En.

In an advantageous embodiment, if the norms of the initial residual error vectors $(IEn)_{1 \le n \le N}$ corresponding to the initial beacon positions IBP are higher than a threshold, then the initial beacon positions IBP may be re-estimated. This allows decreasing the computational cost of the method: the more precise the initial beacon positions IBP are, the faster the method ends. Simulations show that an accuracy of 5 meters for the initial beacon positions is sufficient to obtain good calibration results.

In a step Det_Out, outliers in the measurements are detected. By outlier, it is meant a measurement that is incoherent or too different from the other measurements. These outliers may be due to Non-Line-Of-Sight conditions or to multipath effects, for instance. A Grubbs test, described in the publication "Procedures for detecting outlying observations in samples", by Franck E. Grubbs, Technometrics, 11(1):121, 1969, may be used on the previously calculated N residual error vectors, to identify these erroneous measurements. Then, in a step Exc_Out, the outliers are excluded from the corresponding sets of measurements, so as to allow a robust calibration. However, it should be noted that in each set of measurements, at least 4 measurements are required for 2D movements and 5 measurements for 3D movements.

In a step Det_OBP, optimal beacon positions OBP that minimize an objective function OF depending on N residual error vectors En, n∈[1;N], are determined. The objective function OF may be defined by $$\sqrt{\frac{1}{N} \sum_{n=1}^{N} \frac{|En|^2}{Bn}},$$

for instance. The step Det_OBP comprises a sub-step of varying Var_BP the assumed positions of the beacon nodes, calculating a new mobile node position corresponding to the new beacon positions BP, calculating Cal_En N new residual error vectors $(En)_{1 \leq n \leq N}$ accordingly, and evaluating Eva_OF the objective function OF. These sub-steps are reiterated as long as the objective function does not meet a termination criterion. For instance, the termination criterion is: the objective function converges. However, there are several possible termination criteria, e.g. the absolute change of the objective function, the relative change of the objective function, the number of iterations, etc. In a possible implementation, the loop is stopped when the objective function has reduced by less than 0.1% compared to the last iteration.

The step Det_OBP may be performed by using a Sequential quadratic Programming (SQP). SQP are iterative methods for nonlinear optimization, that are used on problems for which an objective function has to be optimized. This method is described in the publication "Sequential Quadratic Programming" by P. T. Boggs and J. W. Tolle, Acta numerica, 4:1-51, 1995. However, any other optimization algorithm may be used. In a possible embodiment, a global optimization algorithm is used instead of a local optimization algorithm such as SQP, so as to avoid arriving to a solution that is only locally but not globally optimal (which could be the case if the objective function comprises several local minima). However, this would increase the computational cost of finding a solution, thus hampering the practical usability of the calibration procedure.

In a step Chg_CS, the coordinate system may be rotated and/or shifted, so as to facilitate the handling of the data recorded. For example, if the system is used to track player positions in a rugby game, the x-axis and y-axis of the coordinate system can be aligned with the playing field.

Of course, the present invention is not limited to the illustrated example but may be subject to various variants and alterations, which will be apparent to those skilled in the art.

The invention claimed is:

1. A method for calibrating a time difference of arrival-based local positioning system for kD localization, k=2 or 3, comprising:
estimating initial beacon positions:
collecting N sets of time difference of arrival measurements related to a mobile node, N≥2, each $n^{th}$ set of measurements being performed by Bn beacon nodes among B beacon nodes of the positioning system while the mobile node is located is a $n^{th}$ position within a region covered by the positioning system, Bn≥k+2;
calculating N residual error vectors through calculation of N positions of the mobile node, by the N sets of time difference of arrival measurements and beacon positions, a calculation of the $n^{th}$ position of the mobile node enabling a calculation of an $n^{th}$ initial residual error vector, the calculation of each $n^{th}$ position of the mobile node using the beacon positions and the $n^{th}$ set of measurement;
determining optimal beacon positions that minimize an objective function depending on the N residual error vectors; and
calibrating the local positioning system based on the optical beacon positions,
wherein the objective function is defined by $$\sqrt{\frac{1}{N} \sum_{n=1}^{N} \frac{|En|^2}{Bn}}.$$

2. The method according to according to claim 1, further comprising, between the collecting measurements and the determining optimal beacon positions, detecting outliers in the measurements and excluding said outliers from the corresponding sets of measurements.

3. The method according to claim 2, wherein the step of detecting outliers comprises calculating N initial residual error vectors corresponding to said initial beacon positions, and using a Grubb test on said vectors.

4. The method according to according to claim 1, wherein the step of determining optimal beacon positions comprises varying assumed beacon positions from the initial positions until the objective function meets a termination criterion.

5. The method according to claim 4, wherein said criterion is a convergence of the objective function.

6. The method according to claim 4, wherein if the norm of the residual error vectors corresponding to the initial beacon positions are higher than a threshold, then the method comprises a step of re-estimating initial beacon positions.

7. The method according to according to claim 1, wherein the N mobile node positions are distributed over the whole region covered by the positioning system.

8. The method according to according to claim 1, wherein, the determining optimal beacon positions includes calculating the mobile node positions in a coordinate system having a beacon node as point of origin, and the method further comprises a final step of rotating and/or shifting said coordinate system.

9. A method for calibrating a time difference of arrival-based local positioning system for kD localization, k=2 or 3, comprising:
estimating initial beacon positions:
collecting N sets of time difference of arrival measurements related to a mobile node, N≥2, each $n^{th}$ set of measurements being performed by Bn beacon nodes among B beacon nodes of the positioning system while the mobile node is located is a $n^{th}$ position within a region covered by the positioning system, Bn≥k+2;
calculating N residual error vectors through calculation of N positions of the mobile node, by the N sets of time difference of arrival measurements and beacon positions, a calculation of the $n^{th}$ position of the mobile node enabling a calculation of an $n^{th}$ initial residual error vector, the calculation of each $n^{th}$ position of the mobile node using the beacon positions and the $n^{th}$ set of measurement;
determining optimal beacon positions that minimize an objective function depending on the N residual error vectors; and
calibrating the local positioning system based on the optical beacon positions,
wherein the step of determining optimal beacon positions comprises varying assumed beacon positions from the initial positions until the objective function meets a termination criterion, and wherein the method comprises a step of re-estimating initial beacon positions when the norm of the residual error vectors corresponding to the initial beacon positions are higher than a threshold.

* * * * *